(12) United States Patent
Balasubramanyan et al.

(10) Patent No.: US 8,407,530 B2
(45) Date of Patent: Mar. 26, 2013

(54) SERVER REACHABILITY DETECTION

(75) Inventors: Balaji Balasubramanyan, Redmond, WA (US); Miko Arnab Sakhya Singha Bose, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 12/822,238

(22) Filed: Jun. 24, 2010

(65) Prior Publication Data

US 2011/0320889 A1    Dec. 29, 2011

(51) Int. Cl.
  *G06F 11/00* (2006.01)
(52) U.S. Cl. .............. 714/56; 714/55; 714/42
(58) Field of Classification Search .......... 714/1, 2, 714/25, 38.1, 47.1, 55
  See application file for complete search history.

(56) References Cited

U.S. PATENT DOCUMENTS

| | | | |
|---|---|---|---|
| 6,944,788 B2 | 9/2005 | Dinker | |
| 7,680,933 B2 | 3/2010 | Fatula, Jr. | |
| 7,711,721 B2 | 5/2010 | Dearing | |
| 2002/0116461 A1 | 8/2002 | Diacakis | |
| 2006/0212760 A1* | 9/2006 | Swoboda | 714/38 |
| 2006/0248034 A1 | 11/2006 | Soderberg | |
| 2007/0220302 A1* | 9/2007 | Cline et al. | 714/4 |
| 2009/0070406 A1 | 3/2009 | Terpstra | |
| 2010/0030839 A1* | 2/2010 | Ceragioli et al. | 709/201 |
| 2010/0241894 A1* | 9/2010 | Patel et al. | 714/4 |
| 2010/0325485 A1* | 12/2010 | Kamath et al. | 714/15 |

OTHER PUBLICATIONS

Microsoft Corporation, Primary DNS server is unreachable, Nov. 18, 2005, 1 page.
LANDesk, "High Availability Server Management," Oct. 11, 2007, 7 pages.

* cited by examiner

*Primary Examiner* — Scott Baderman
*Assistant Examiner* — Sarai Butler
(74) *Attorney, Agent, or Firm* — Merchant & Gould

(57) ABSTRACT

An application attempts to use a first protocol stack to send a first message to a server. After attempting to send the first message to the server, the application attempts to use a second protocol stack to send a second message to the server. After attempting to send the second message to the server, the application performs a timeout activity before a timeout period for the second message expires when the first message timed out. Alternatively, when the timeout period for the second message expires and the first message did not time out, the application performs the timeout activity. When the client device received a response to the second message from the server before the timeout period for the second message expires, the application performs a different activity.

17 Claims, 12 Drawing Sheets

SERVER REACHABILITY DETECTION

BACKGROUND

Various types of resources can be stored on servers. Client devices communicate with the servers to access such resources. For example, a server can store word processor documents. In this example, a client device can retrieve word processor documents from the server and store documents back to the server.

A server may become unreachable to a client device. When the server is unreachable by the client device, the client device does not receive messages from the server. A server may become unreachable by the client device for a variety of reasons. For example, a server may become unreachable by the client device when the server fails, when a network connection fails, when the client device becomes disconnected from a network, or when other events occur.

An application operating on a client device can use a protocol stack to communicate with a server. When the server is reachable by the client device, the protocol stack provides data to the application in response to requests by the application. When a server becomes unreachable by the client device, the protocol stack does not receive responses from the server. Hence, when the protocol stack does not receive a response from the server within a given timeout period, the protocol stack provides an error to the application. In some instances, the application is not responsive to user input while the application is waiting for responses from the protocol stack. Consequently, when the server becomes unreachable, the user may be forced to wait for the given timeout period before the application again becomes responsive to user input.

In some circumstances, the application uses multiple protocol stacks to communicate with the server. Furthermore, the application can be unresponsive to user input when waiting for responses from each of these multiple protocol stacks. Consequently, the user may be forced to wait for the expiration of the timeout periods for each of the multiple protocol stacks when the server becomes unreachable to the client device. Being forced to wait in this manner can be annoying to the user and decrease productivity. The application can be unresponsive during this time, thereby preventing the user from interacting with the application or using the application to do work.

SUMMARY

An application attempts to use a given protocol stack to communicate with a server. Subsequently, the application attempts to use another protocol stack to communicate with the server. If the server was reachable when the application attempted to use the given protocol stack to communicate with the server, the application performs a timeout activity after waiting for a timeout period to expire. If the server was unreachable when the application attempted to use the given protocol stack to communicate with the server, the application performs the timeout activity without waiting for the timeout period to expire.

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
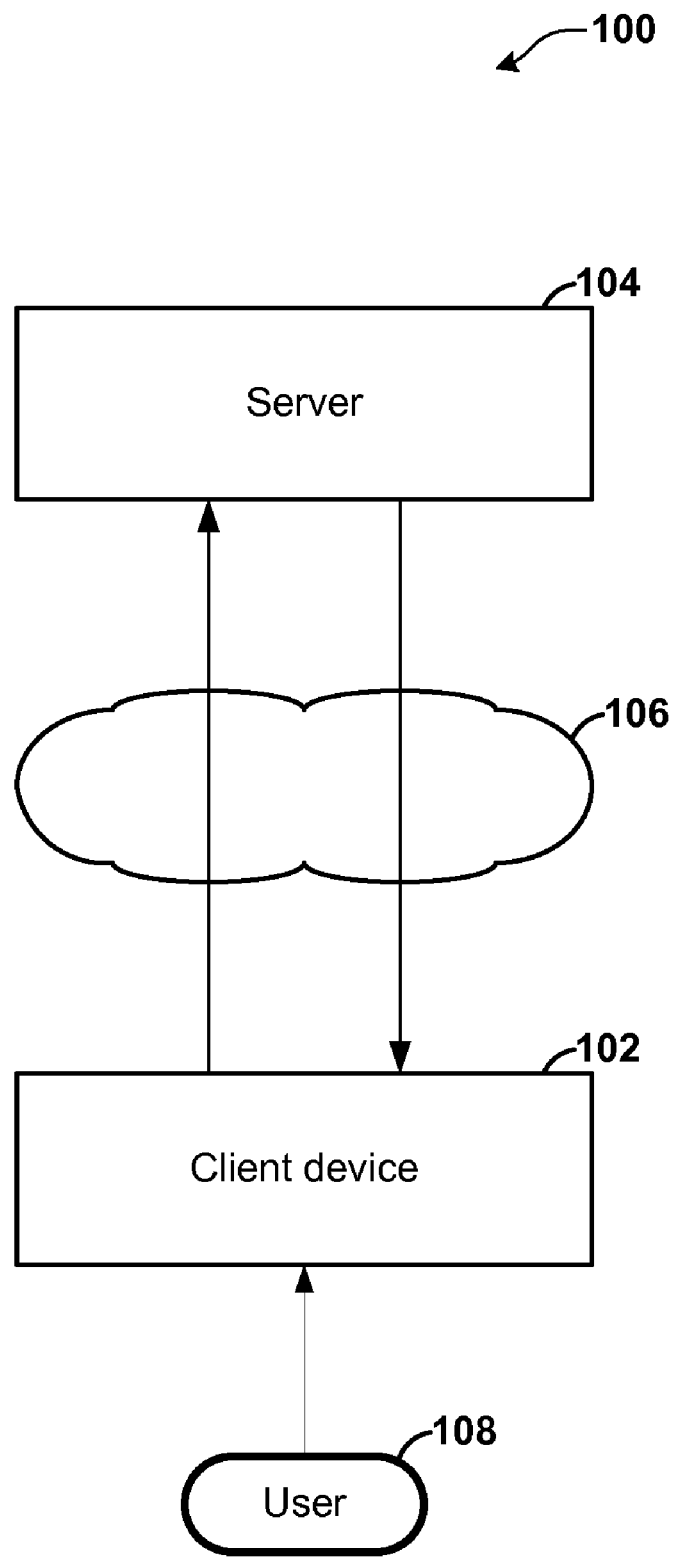
FIG. 1 is a block diagram illustrating an example system.

FIG. 1 is a block diagram illustrating an example system 100. As illustrated in the example of FIG. 1, the example system 100, the system 100 comprises a client device 102, a server 104, and a network 106. It should be appreciated that other embodiments can include devices, networks, systems, and so on in addition to those the system 100.

The server 104 is a computing system that stores documents. In various embodiments, the server 104 can be implemented in various ways. For example, in some embodiments, the server 104 can be implemented using MICROSOFT® SHAREPOINT server software. The server 104 can store various types of documents. For example, the server 104 can store word processor documents, spreadsheet documents, note documents, slide presentation documents, web page documents, desktop publishing documents, project design documents, diagram documents, image documents, and other types of documents.

A user 108 uses the client device 102 to retrieve and work on documents stored by the server 104. Furthermore, in some embodiments, the user 108 can use the client device 102 to create new documents and to store the new documents at the server 104. To help the user 108 retrieve, generate, and store documents, the client device 102 provides an application. For example, the client device 102 can provide a word processing application, such as the MICROSOFT® WORD word processing document, to help the user 108 retrieve, generate, and store word processor documents. In another example, the client device 102 can provide a spreadsheet application, such as the MICROSOFT® EXCEL® spreadsheet application, to help the user 108 retrieve, generate, and store spreadsheet documents.

To retrieve documents stored by the server 104 and to store documents to the server 104, the client device 102 communicates with the server 104 via the network 106. In particular, the application provided by the client device 102 uses multiple protocol stacks to communicate with the server 104. A protocol stack is a set of communications protocols that work together to enable communication on a network. A communications protocol is a set of rules or standards designed to enable computers to connect with one another and to exchange information. Example types of communications protocols include the Hypertext Transfer Protocol (HTTP), the File Transfer Protocol (FTP), the SOAP protocol, and so on.

Under certain circumstances, the server 104 can become unreachable by the client device 102. When the server 104 is unreachable by the client device 102, the client device 102 and the server 104 are unable to exchange messages. Consequently, when the server 104 becomes unreachable by the client device 102, the client device 102 does not receive messages from the server 104 in response to messages sent by the client device 102 to the server 104. In other words, the client device 102 sends out a message to the server 104, but the client device 102 does not receive a response message back from the server 104.

The server 104 can become unreachable by the client device 102 for a variety of reasons. For example, the server 104 can become unreachable by the client device 102 when the user 108 unplugs a network cable from the client device 102. In another example, the server 104 can become unreachable by the client device 102 when the server 104 crashes. In yet another example, the server 104 can become unreachable by the client device 102 when the client device 102 moves outside the range of a wireless network access point through which the client device 102 is communicating with the server 104.

The client device 102 can communicate with the server 104 using multiple protocol stacks. For example, the client device 102 can communicate with the server 104 using a protocol stack that includes HTTP and a protocol stack that includes SOAP. If the client device 102 does not receive a response message from the server 104 in response to a request message generated by one of the protocol stacks, the client device 102 determines that the server 104 is unreachable by the client device 102. The client device 102 uses the knowledge that the server 104 is unreachable at times when the client device 102 would use other protocol stacks to communicate with the server 104.

If an attempt by the application to communicate with the server using a first one of the protocol stacks times out, the client device 102 can perform a timeout activity without waiting for a timeout period to expire when the client device 102 reaches a point where the application would attempt to communicate with the server using the first protocol stack or a second one of the protocol stacks. To elaborate, the client device 102 may reach a point in a program that instructs the client device 102 to use a given protocol stack to communicate with the server 104. The client device 102 can perform various activities if the client device 102 is able to successfully use the given protocol stack to communicate with the server 104. For example, the client device 102 can display a document stored by the server 104 when the server 104 is reachable. In another example, the client device 102 can save a document to the server 104 when the server 104 is reachable.

However, the client device 102 performs a timeout activity if the server 104 is unreachable. In various embodiments, the client device 102 can perform various timeout activities. For example, the client device 102 can open a locally-stored document instead of a remotely-stored document when the server 104 is unreachable. In another example, the client device 102 can display an error message to the user 108 when the server 104 is unreachable.

When the server 104 is unreachable, but the client device 102 has not previously determined that the server 104 is unreachable, the client device 102 uses the given protocol stack to generate a message and to send this message to the server 104. The client device 102 then waits for a timeout period to expire after sending the message before performing the timeout activity. For example, if the client device 102 does not receive a response to the message from the server 104 within one minute, the client device 102 performs the timeout activity.

However, when the client device 102 has previously determined that the server 104 is unreachable, the chances of the client device 102 receiving a response to the message are small. Accordingly, when the client device 102 has previously determined that the server 104 is unreachable, the client device 102 does not need to generate or send the message to the server 104. Furthermore, when the client device 102 has previously determined that the server 104 is unreachable, the client device 102 does not need to wait for the timeout period to expire before performing the timeout activity. In this way, the client device 102 does not waste time by waiting for the message to time out when the client device 102 already has the knowledge that the server 104 is unreachable.

Figure 2:
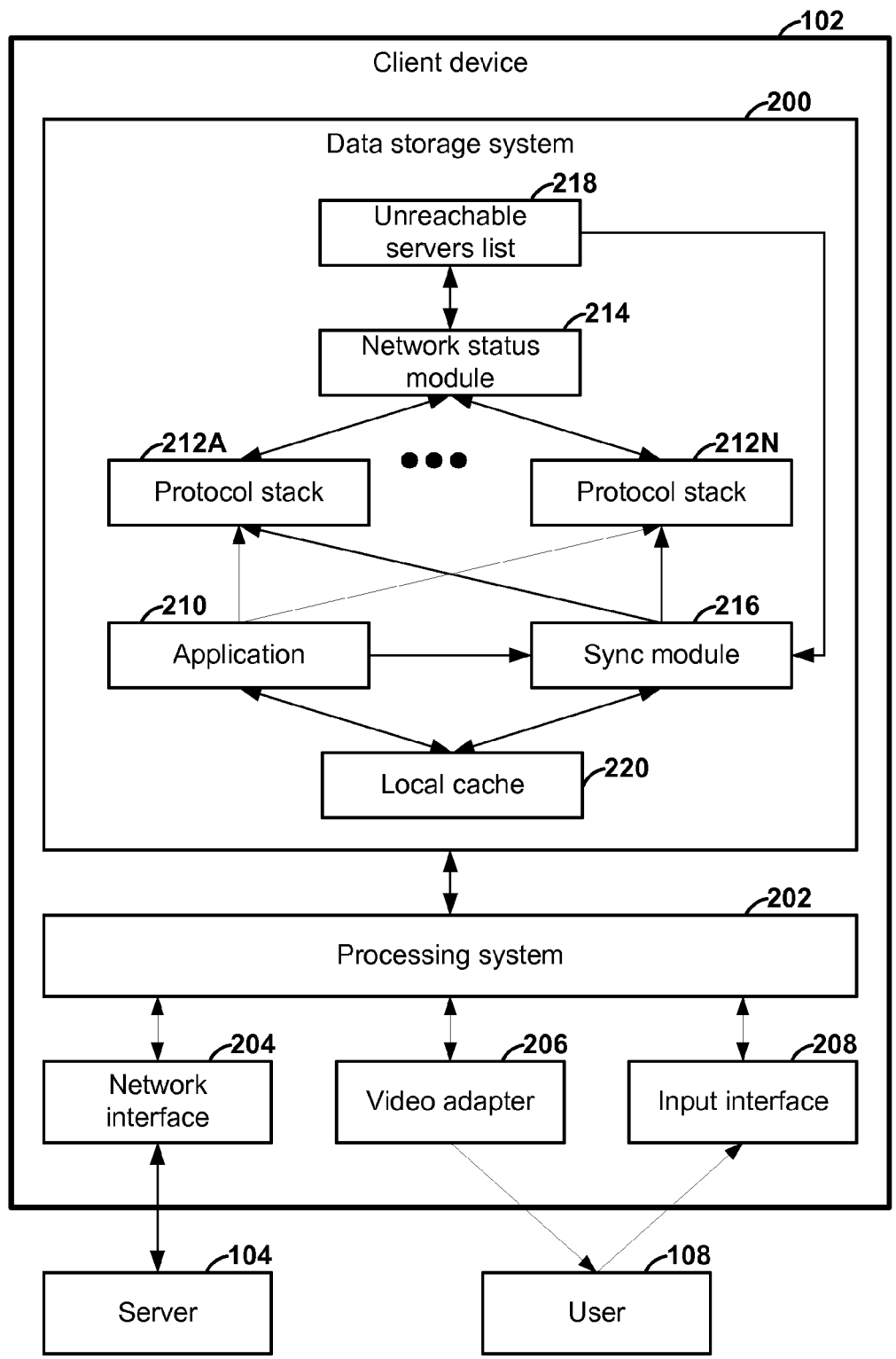
FIG. 2 is a block diagram illustrating example details of a client device in the system.

FIG. 2 is a block diagram illustrating example details of the client device 102. In various embodiments, the client device 102 can be a variety of different types of computing devices. For example, the client device 102 can be a desktop computer, a laptop computer, a smartphone, a handheld gaming device, a video gaming console, a computing device integrated into a vehicle, a tablet computer, or another type of computing device.

As illustrated in the example of FIG. 2, the client device 102 includes a data storage system 200, a processing system 202, a network interface 204, a video adapter 206, and an input interface 208. It should be appreciated that the client device 102 can contain many other devices, modules, systems, interfaces, and other components. Such other components are omitted from the example of FIG. 2 for the sake of clarity.

The data storage system 200 is a set of one or more computer-readable storage media. A computer-readable storage medium is a physical device or article of manufacture that is capable of storing computer-readable information. The processing system 202 is a system comprising one or more processing units. A processing unit is an integrated circuit or other type of device that executes computer-readable instructions. The network interface 204 is a component that enables the client device 102 to communicate with other computing devices via a network. The video adapter 206 is a component that enables the client device 102 to generate a video signal sent to a device (e.g., a monitor) that displays video represented by the video signal. The input interface 208 is a component that enables the user 108 to provide input to the client device 102. For example, the input interface 208 can be a component that enables the user to provide keyboard and/or pointer input to the client device 102.

As illustrated in the example of FIG. 2, the data storage system 200 stores computer-readable instructions and other data that, when executed or otherwise used by the processing system 202, cause the client device 102 to provide an application 210, a set of protocol stacks 212A through 212N, a network status module (NSM) 214, a sync module 216. In addition, the data storage system 200 stores an unreachable servers list 218 and a local cache 220. The protocol stacks 212A through 212N are collectively referred to herein as the "protocol stacks 212." It should be appreciated that the data storage system 200 can store computer-readable instructions that, when executed by the processing system 202, cause the client device 102 to provide other functionality. Furthermore, it should be appreciated that the data storage system 200 can store data other than illustrated in the example of FIG. 2.

The application 210 uses one or more of the protocol stacks 212 to communicate with the server 104. In various embodiments, the application 210 can communicate with the server 104 for a variety of reasons. For example, the application 210 can be a word processing application. In this example, the application 210 can communicate with the server 104 to retrieve a document from the server 104 and to store documents to the server 104. In another example, the application 210 is a video game application. In this example, the application 210 can communicate with the server 104 to obtain mission data and to upload mission results.

In some embodiments where the application 210 enables the user 108 to work with a document stored by the server 104, the application 210 obtains a copy of the document from the server 104 and stores the copy of the document in the local cache 220. In this specification, the copy of the document in the local cache 220 is said to correspond to the copy of the document stored by the server 104. Documents stored in the local cache 220 are referred to herein as local documents. Documents stored by the server 104 are referred to herein as server documents. After the application 210 stores a local document in the local cache 220, the application 210 can modify the local document in the local cache 220, even if the server 104 becomes unreachable by the client device 102. When the user 108 is working with the local document without maintaining synchronization between the local document and the corresponding server document, the user 108 is working offline with regard to the local document.

Each of the protocol stacks 212 provides a software infrastructure for a different protocol stack. As also discussed elsewhere in this specification, a protocol stack is a set of communications protocols that work together to enable communication on a network. In various embodiments, the protocol stacks 212 provide the software infrastructure for protocol stacks that include various communications protocols. For example, the protocol stack 212A can provide a software infrastructure for a protocol stack that includes the HTTP protocol. In this example, the protocol stack 212B (not shown) can provide a software infrastructure for a protocol stack that includes the WebDAV protocol. Furthermore, in this example, the protocol stack 212C (not shown) can provide a software infrastructure for a protocol stack that includes the Web DAV protocol and other protocols.

In some embodiments, each of the protocol stacks 212 used by the application 210 to communicate with the server 104 establish a session with the server 104. The protocol stacks 212 then use these sessions to exchange messages with the server 104. A session is a semi-permanent interactive information interchange. The protocol stacks 212 can maintain state information in such sessions.

The protocol stacks 212 receive requests from the application 210 to send data. In response to such requests, the protocol stacks 212 provide server status requests to the NSM 214. The server status requests are requests for server status indicators for servers. The server status indicators indicate whether the servers are listed in the unreachable servers list 218. Servers that are listed in the unreachable servers list 218 are referred to herein as listed servers. In some embodiments, each of the servers listed in the unreachable servers list 218 in uniquely identified. For instance, each of the servers listed in the unreachable servers list 218 can be associated with a Uniform Resource Identifier (URI) or a Uniform Resource Locator (URL). The NSM 214 uses the unreachable servers list 218 to provide appropriate server status indicators in response to the server status requests.

If one of the protocol stacks 212 receives a server status indicator that indicates that a server is on the unreachable servers list 218, the protocol stack provides a timeout stack response to the application 210 without waiting for a timeout period to expire. The timeout stack response comprises a timeout error. If one of the protocol stacks 212 receives a status indicator that indicates that a server is not on the unreachable servers list 218, the protocol stack generates and sends a message to the server. If the protocol stack receives a response from the server, the protocol stack provides a stack response to the application 210. This stack response can comprise data included in the message received from the server. Otherwise, if the protocol stack fails to receive a response from the server within a timeout period, the protocol stack instructs the NSM 214 to add the server to the unreachable servers list 218 and then provides a timeout stack response to the application 210.

The NSM 214 can test the servers listed on the unreachable servers list 218 to determine whether the servers are again reachable by the client device 102. If the NSM 214 determines that a server listed on the unreachable servers list 218 is again reachable by the client device 102, the NSM 214 removes the server from the unreachable servers list 218. Furthermore, the application 210, the sync module 216, and/or other components of the NSM 214 can remove servers from the unreachable servers list 218 in response to input from the user 108.

In some embodiments, the NSM 214 is associated exclusively with the application 210. For example, in some embodiments, the NSM 214 is instantiated by the application 210 when the application 210 starts. Furthermore, in some embodiments, the NSM 214 is terminated when the application 210 shuts down.

Although not illustrated in the example of FIG. 2, the client device 102 can provide multiple applications. For example, the client device 102 can provide a word processing application and a spreadsheet application. In some embodiments, these applications are associated with their own NSMs. The NSMs operate in a similar manner to the NSM 214 discussed in this specification. Each of the NSMs uses the same unreachable servers list 218 to provide appropriate server status indicators to the protocol stacks 212. Furthermore, each of the NSMs adds and removes servers from the unreachable servers list 218. Because each of the NSMs use the unreachable servers list 218, if one of the NSMs adds a given server to the unreachable servers list 218, another one of the NSMs can provide a server status indicator that indicates that the given server is unreachable. In this way, if a protocol stack associated with one application determines that a given server did not respond to a request within a timeout period, that protocol stack or another protocol stack associated with another application can return a timeout error to the other application without waiting for another timeout period to expire.

The user 108 may use the application 210 to work offline with one or more documents associated with a server that is unreachable by the client device 102. Furthermore, the user 108 may close the application 210 before the server becomes reachable again by the client device 102. Because the NSM 214 is associated with the application 210, the NSM 214 also closes when the application 210 closes. However, the unreachable servers list 218 is independent of the application 210. Hence, servers can remain listed on the unreachable servers list 218 after the application 210 and the NSM 214 close. Keeping servers listed on the unreachable servers list 218 allows NSMs used by other applications to determine which servers are unreachable. However, when there are no NSMs testing whether listed servers are reachable, some of the servers could remain listed on the unreachable servers list 218 even though these servers are reachable by the client device 102. The sync module 216 tests listed servers whose reachability status is not being tested by NSMs to determine whether such listed servers are again reachable by the client device 102.

Figure 3:
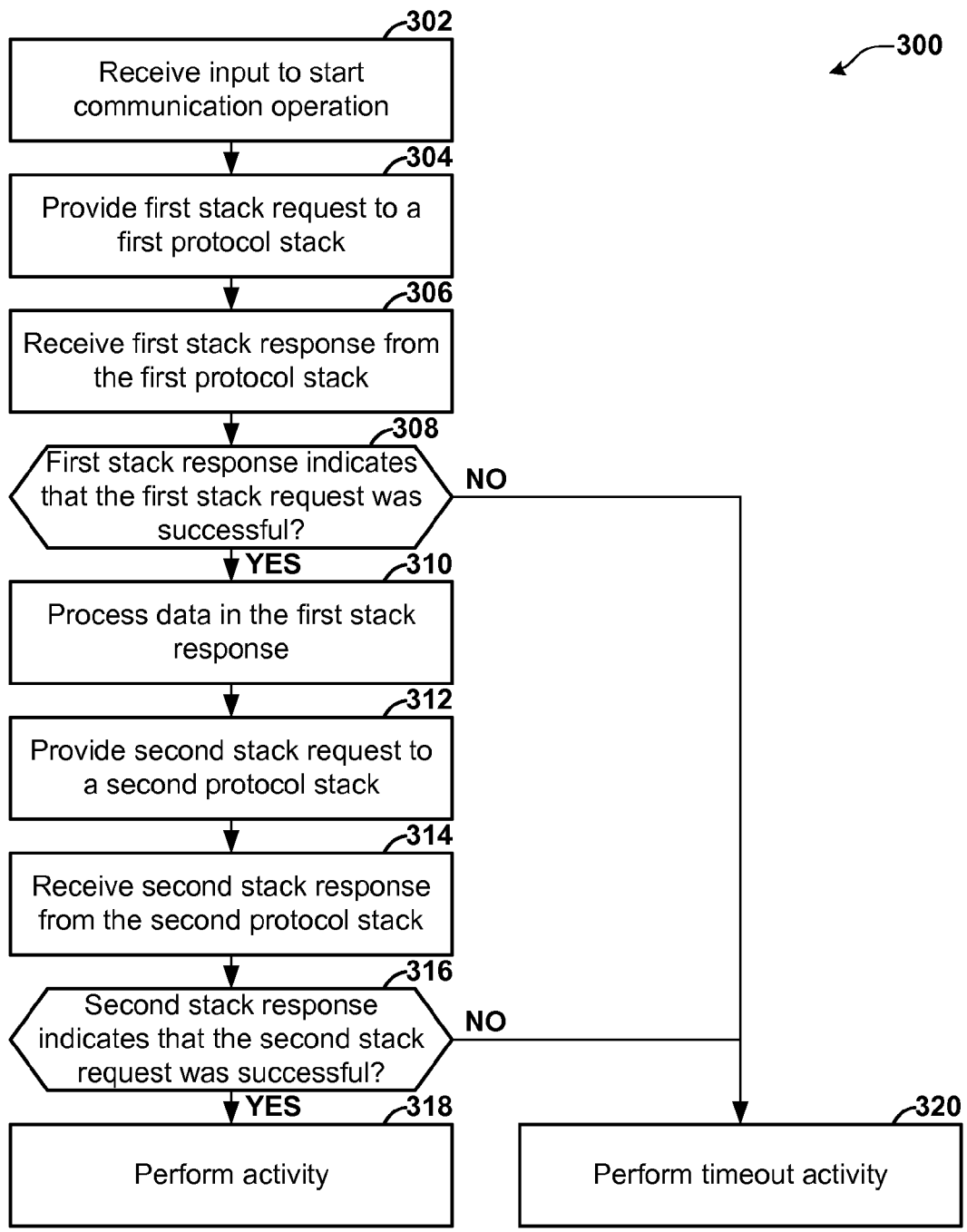
FIG. 3 is a flowchart illustrating an example operation of an application provided by the client device.

FIG. 3 is a flowchart illustrating an example communication operation 300 performed by the application 210. As illustrated in the example of FIG. 3, the communication operation 300 begins when the application 210 receives input from the user 108 to start the communication operation 300 (302). In various embodiments, the application 210 can receive input from the user 108 to start various types of communication operations. For example, the application 210 can receive input from the user 108 to start an open document dialog. During the open document dialog, the user 108 browses a set of folders and documents to select the document that the user 108 wants to open in the application 210. In another example, the application 210 can receive input from the user 108 to start a save-as dialog. During the save-as dialog, the user 108 browses a set of folders and documents to select a folder in which to save a document that is currently open in the application 210. In both of these example, the application 210 uses multiple ones of the protocol stacks 212 to retrieve information about the server 104, to retrieve information about the folders, to retrieve information about the documents, to retrieve or store a copy of the document, and/or to perform other tasks.

In response to receiving the input from the user 108 to start the communication operation, the application 210 provides a stack request to one of the protocol stacks 212 (304). For ease of explanation, this specification assumes that the application 210 provides a stack request to the protocol stack 212A in step 304. Furthermore, for ease of explanation, the stack request provided to the protocol stack 212A is referred to herein as the first stack request. The first stack request comprises a request to the protocol stack 212A to attempt to communicate with the server 104. For example, the first stack request can be a request to retrieve information about folders maintained by the server 104. By sending the stack request to the protocol stack 212A, the application 210 is attempting to use the protocol stack 212A to send the message to the server 104.

After providing the first stack request to the protocol stack 212A, the application 210 receives a stack response from the protocol stack 212A (306). In this way, the application 210 receives the stack response from the protocol stack 212A in response to the attempt to use the protocol stack 212A to send the message to the server 104. For ease of explanation, the stack response received from the protocol stack 212A is referred to herein as the "first stack response." The first stack response can include various types of data. For example, the first stack response can include information about folders maintained by the server 104. Alternately, the first stack response can indicate that a connection to the server 104 timed out.

In some embodiments, the actions performed by the application 210 depend on the content of the first stack response. Consequently, in such embodiments, the application 210 may need to wait to receive the first stack response before taking any further action. In some instances, the application 210 is not responsive to input from the user 108 while the application 210 is waiting to receive the first stack response. In other words, the application 210 can "hang" while the application 210 is waiting to receive the first stack response from the protocol stack 212A.

Hence, after the application 210 receives the first stack response, the application 210 determines whether the first stack response indicates that the first stack request was successful (308). In other words, the application 210 uses the first stack response to determine whether the attempt to communicate with the server 104 using the protocol stack 212A was successful. In various embodiments, the application 210 can determine that the first stack request was successful in various ways. For example, the application 210 can determine that the first stack request was successful when the first stack response includes a status code indicating that the first stack request was successful. In another example, the application 210 can determine that the first stack request was unsuccessful when the first stack response includes an error code or an error message indicating that the first stack request was not successful.

The first stack request can be unsuccessful for a variety of reasons. For example, the first stack request could fail because the first stack request relates to a resource that is not hosted by the server 104. In another example, the first stack request could fail because the user 108 is not allowed to access the first stack request without providing appropriate credentials. In yet another example, the first stack request could fail because the server 104 is not reachable by the client device 102.

If the application 210 determines that the first stack request was successful ("YES" of 308), the application 210 can then process the data in the first stack response (310). The application 210 can process the data in the first stack response in various ways. For example, the first stack response can contain data regarding the folders maintained by the server 104. In this example, the application 210 can process the data in the first stack response by displaying the information about the folders maintained by the server 104 to the user 108.

The application 210 also sends a stack request to another one of the protocol stacks 212 (312). For ease of explanation, this specification assumes that the application 210 provides a stack request to the protocol stack 212B in step 310. Furthermore, for ease of explanation, the stack request provided to the protocol stack 212B is referred to as the second stack request. The second stack request comprises a request to the protocol stack 212B to attempt to communicate with the server 104. For example, the second stack request can be a request to retrieve information about an individual document stored by the server 104. By sending the second stack request to the protocol stack 212B, the application 210 is attempting to use the protocol stack 212B to send the message to the server 104.

Subsequently, the application 210 receives a stack response from the protocol stack 212B (314). In this way, the application 210 receives the stack response from the protocol stack 212B in response to the attempt to use the protocol stack 212B to send the message to the server 104. For ease of explanation, the stack response received from the protocol stack 212B is referred to herein as the second stack response. In some embodiments, the actions performed by the application 210 depend on the content of the second stack response. Consequently, in such embodiments, the application 210 may need to wait to receive the second stack response before taking any further action. As a result, the application 210 can become unresponsive to input from the user 108 while the application 210 is waiting to receive the second stack response.

When the application 210 receives the second stack response, the application 210 determines whether the second stack response indicates that the second stack request was successful (316). In other words, the application 210 uses the second stack response to determine whether the attempt to communicate with the server 104 using the protocol stack 212B was successful. If the application 210 determines that the second stack response indicates that the second stack request was successful ("YES" of 316), the application 210 can then perform some activity (318). In various embodiments, the application 210 can perform various activities. The application 210 can display the information about the documents in the particular folder to the user 108. In another example, the application 210 can retrieve a copy of a server document from the server 104.

However, if the application 210 determines that the first stack response does not indicate that the first stack request was successful ("NO" of 308) or if the application 210 determines that the second stack response does not indicate that the second stack request was successful ("NO" of 316), the application 210 performs a timeout activity (320). In various embodiments, the application 210 can perform various timeout activities. For example, the application 210 can notify the user 108 that a communication error has occurred. In another example, if the first or second responses are not successful, the application 210 allows the user 108 to work on a document offline. When the user 108 is working with a document offline, the application 210 manipulates a local document stored in the local cache 220. For example, the communication operation 300 can be an operation to open a document stored at the server 104. In this example, the application 210 attempts to identify and open a document in the local cache 220 that corresponds to the document stored at the server 104. In another example, the communication operation 300 can be an operation to upload a document stored in the local cache 220 to the server 104. In this example, the user 108 can continue working on the document offline and the document is stored to the server 104 at a later time.

It should be appreciated that the communication operation 300 is merely an example. In other embodiments, the application 210 can perform more complex operations involving multiple ones of the protocol stacks 212. For example, the communication operation can be an operation to open a document stored by the server 104. In this example, the application 210 can use one of the protocol stacks 212 to send one or more Web DAV protocol requests to the server 104. The Web DAV protocol requests retrieve information that describes a folder hierarchy maintained by the server 104. The application 210 can then use another one of the protocol stacks 212 to send one or more Web View protocol requests to the server 104. The Web View protocol requests retrieve data about documents in a particular one of the folders. The application 210 can then use yet another one of the protocol stacks 212 to send one or more FrontPage RPC (FPRPC) protocol requests to the server 104. The FPRPC protocol requests retrieve metadata regarding a particular one of the documents. Next, the application 210 can use yet another one of the protocol stacks 212 to send one or more Web DAV protocol requests to the server 104. These Web DAV protocol requests retrieve a file from the server 104. In other embodiments, the application 210 uses a protocol stack to send one or more MS-FSSHTTP protocol requests to the server 104 to retrieve the document instead of the Web DAV protocol requests.

In the example of FIG. 3, the application 210 sends the second stack request to the protocol stack 212B. However, it should be appreciated that, in some cases, the application 210 can send the second stack request to the protocol stack 212A.

In other words, the application 210 can send the first and second stack requests to the same protocol stack. In such cases, the application 210 would not need to wait for the timeout period to expire after providing the second stack request to the protocol stack 212A if the first stack response was not successful. In other words, if the attempt by the application 210 to communicate with the server 104 using a first protocol stack times out, the application 210 performs a timeout activity without waiting for a timeout period to expire when the application 210 reaches a point where the application 210 would attempt to communicate with the server 104 using the first protocol stack again.

Figure 4:
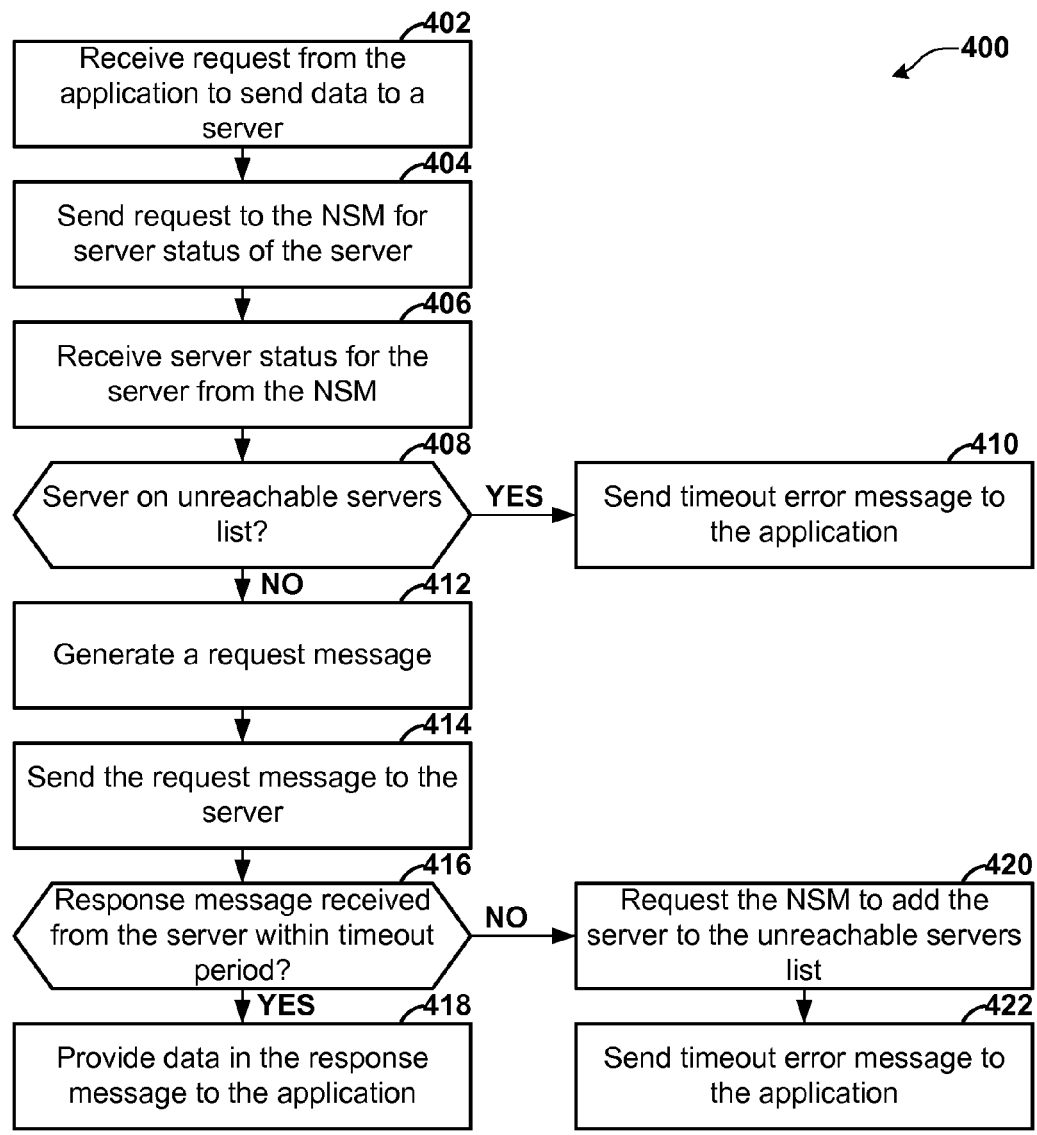
FIG. 4 is a flowchart illustrating an example operation of a protocol stack provided by the client device.

FIG. 4 is a flowchart illustrating an example operation 400 of the protocol stack 212A provided by the client device 102. Although the operation 400 is explained with regard to the protocol stack 212A, the operation 400 can be performed by other ones of the protocol stacks 212.

As illustrated in the example of FIG. 4, the operation 400 begins when the protocol stack 212A receives a stack request from the application 210 to send data to a server (402). For ease of explanation, this specification describes the example of FIG. 4 with the assumption that the protocol stack 212A receives a stack request from the application 210 to send data to the server 104. In various embodiments, the protocol stack 212A can receive the request from the application 210 in various ways. For example, in some embodiments, the application 210 can provide the stack request to the protocol stack 212A by invoking a method of an Application Programming Interface (API) provided by the protocol stack 212A, an operating system of the client device 102, or another component provided by the client device 102. In other embodiments, the application 210 can use a callback to provide the stack request to the protocol stack 212A.

After receiving the stack request from the application 210, the protocol stack 212A sends a server status request to the NSM 214 (404). The server status request is a request for a server status indicator for the server 104. The server status indicator indicates whether the server 104 is listed in the unreachable servers list 218.

In various embodiments, the protocol stack 212A provides the server status request to the NSM 214 in various ways. For example, in some cases, the protocol stack 212A provides the server status request to the NSM 214 by invoking one or more methods of an API provided by the NSM 214, the operating system of the client device 102, or another component provided by the client device 102. In other cases, the NSM 214 registers a callback with the protocol stack 212A when the NSM 214 is initialized. In such embodiments, the protocol stack 212A uses the callback to provide the server status request to the NSM 214. Furthermore, in some embodiments, different ones of the protocol stacks 212 can provide the server status requests to the NSM 214 in different ways. For example, one of the protocol stacks 212 associated with the HTTP protocol can use an API to provide server status requests to the NSM 214 and one of the protocol stacks 212 associated with the Web DAV protocol can use the callback technique to provide server status requests to the NSM 214.

After sending the server status request to the NSM 214, the protocol stack 212A receives a server status indicator for the server 104 from the NSM 214 (406). The server status indicator for the server 104 indicates whether the server 104 is listed on the unreachable servers list 218. In response to receiving the server status indicator for the server 104, the protocol stack 212A determines whether the server status indicator for the server 104 indicates that the server 104 is listed on the unreachable servers list 218 (408).

If the server status indicator for the server 104 indicates that the server 104 is listed in the unreachable servers list 218 ("YES" of 408), the protocol stack 212A sends a timeout error message to the application 210 (410). The timeout error message indicates to the application 210 that the attempt to communicate with the server 104 failed because the client device 102 did not receive a response from the server 104 within a timeout period. When the server status indicator for the server 104 indicates that the server 104 is listed in the unreachable servers list 218, the protocol stack 212A does not wait for the timeout period to expire before sending the timeout error message to the application 210.

If the server status indicator for the server 104 indicates that the server 104 is not listed in the unreachable servers list 218 ("NO" of 408), the protocol stack 212A generates at least one request message (412). Various ones of the protocol stacks 212 can generate various types of request messages. For example, the protocol stack 212A can generate a HTTP request message that is encapsulated within one or more TCP frames that are encapsulated within one or more IP packets. In another example, the protocol stack 212B can generate a FTP request that is encapsulated within one or more TCP frames that are encapsulated within one or more IP packets. Furthermore, the protocol stacks can contain different data depending on data in the stack request from the application 210, on environmental variables, and/or on other factors. After generating the request message, the protocol stack 212A sends the request message to the server 104 (414).

Later, the protocol stack 212A determines whether the client device 102 received a response message from the server 104 within a timeout period (416). In various embodiments, the timeout period can have various lengths. For example, in some embodiments, the timeout period can be one minute. In another example, the timeout period can be thirty seconds. Furthermore, in some embodiments, different ones of the protocol stacks 212 can use different timeout periods. For example, the protocol stack 212A can use a timeout period of ninety seconds and the protocol stack 212B can use a timeout period of fifty seconds. Furthermore, in some embodiments, the timeout periods used by one or more of the protocol stacks 212 are user configurable.

If the protocol stack 212A received a response message from the server 104 within the timeout period ("YES" of 416), the protocol stack 212A generates a stack response containing data in the response and provides the stack response to the application 210 (418). For example, if the response message contains data representing a list of documents, the protocol stack 212A can generate a stack response containing the data representing the list of documents. Alternatively, the response message can contain data indicating that the request message was not successful. For example, the response message can contain data indicating that the user 108 does not have authorization to access a given resource requested by the request message. In this example, the protocol stack 212A generates a stack response comprising an error message indicating that the user 108 is not authorized to access the given resource.

If the client device 102 did not receive a response message from the server 104 within the timeout period ("NO" of 416), the protocol stack 212A requests the NSM 214 to add the server 104 to the unreachable servers list 218 (420). The protocol stack 212A then generates stack response comprising a timeout error message and provides the stack response to the application 210 (422). The timeout error message indicates to the application 210 that an attempt to communicate with the server 104 failed because the client device 102 did not receive a response message from the server 104 within the timeout period.

Figure 5:
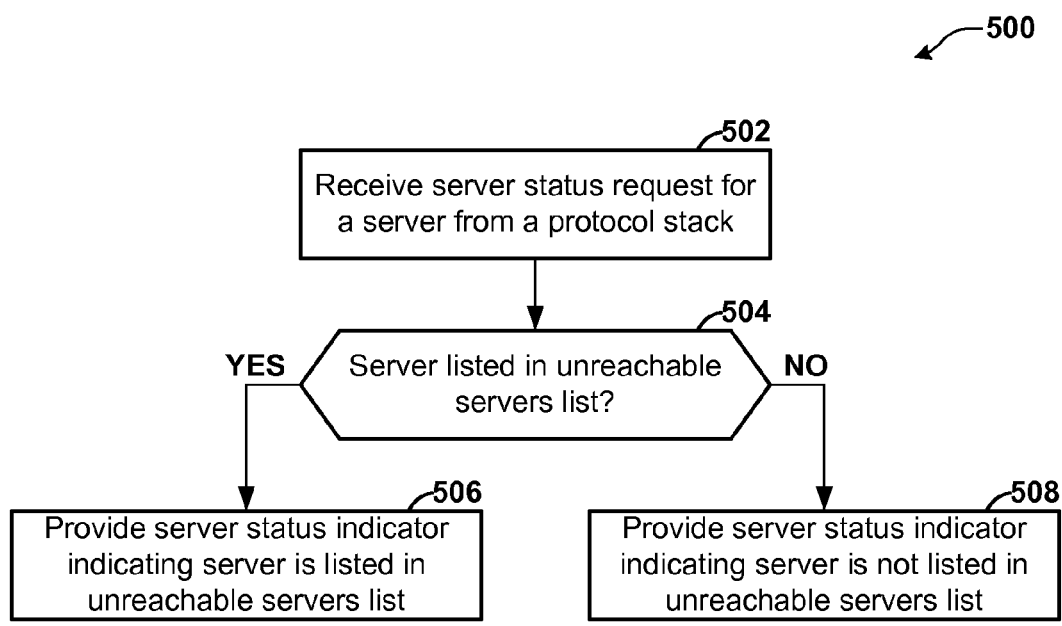
FIG. 5 is a flowchart illustrating an example operation performed by a network status module in response to a server status request.

FIG. 5 is a flowchart illustrating an example operation 500 performed by the NSM 214 in response to a server status request. As illustrated in the example of FIG. 5, the operation 500 begins when the NSM 214 receives a server status request from one of the protocol stacks 212 (500). For ease of explanation, it is assumed in this description of FIG. 5 that the NSM 214 received the server status request from the protocol stack 212A.

When the NSM 214 receives the server status request, the NSM 214 also receives information that identifies a server. In various embodiments, the NSM 214 receives information that identifies the server in various ways. For example, the server status request can include a Uniform Resource Identifier (URI) or a Uniform Resource Locator (URL) of the server. In this example, the URI or URL can specify a protocol, a port number, and/or other information about the server in addition to a domain name and path at the server. For ease of explanation, it is assumed in this description of FIG. 5 that the identified server is the server 104.

In response to the server status request, the NSM 214 determines whether the server 104 is listed in the unreachable servers list 218 (504). If the server 104 is listed in the unreachable servers list 218 ("YES" of 504), the NSM 214 provides a server status indicator to the protocol stack 212A indicating that the server 104 is listed in the unreachable servers list 218 (506). Otherwise, if the server 104 is not listed in the unreachable servers list 218 ("NO" of 504), the NSM 214 provides a server status indicator to the protocol stack 212A indicating that the server 104 is not listed in the unreachable servers list 218 (508).

Figure 6:
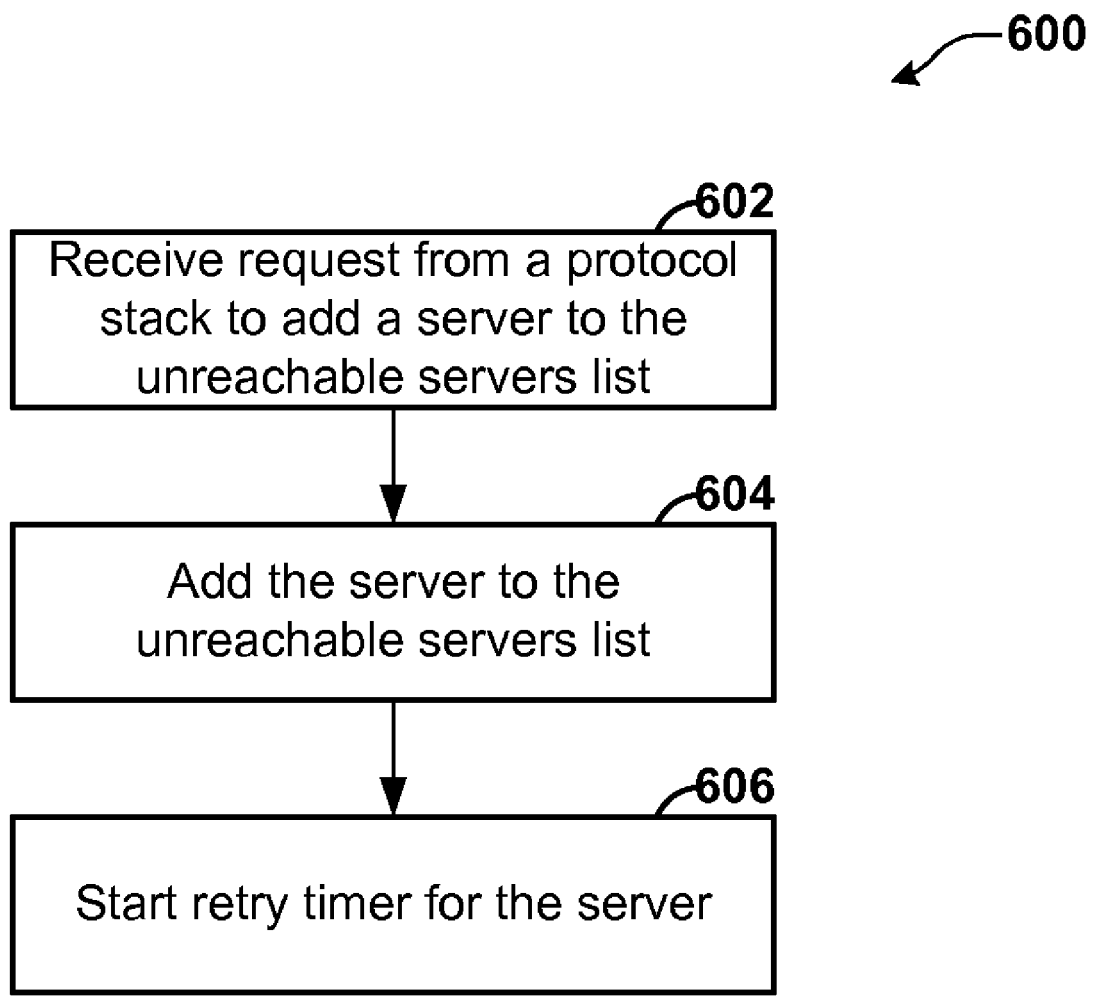
FIG. 6 is a flowchart illustrating an example operation performed by the network status module in response to a request to add a server to an unreachable servers list.

FIG. 6 is a flowchart illustrating an example operation 600 performed by the NSM 214 in response to a request to add a server to the unreachable servers list 218. As illustrated in the example of FIG. 6, the operation 600 begins when the NSM 214 receives a request from one of the protocol stacks 212 to add a server to the unreachable servers list 218 (602). For ease of explanation, this specification assumes that the NSM 214 receives a request to add the server 104 to the unreachable servers list 218.

The NSM 214 then updates the unreachable servers list 218 to include the server 104 (604). In various embodiments, the NSM 214 updates the unreachable servers list 218 to include the server 104 in various ways. For example, when the unreachable servers list 218 is in a registry of the client device 102, the NSM 214 updates the unreachable servers list 218 to include the server 104 by adding a new registry entry to the registry.

Next, the NSM 214 starts a retry timer for the server 104 (606). The retry timer for the server 104 generates an event received by the NSM 214 when a given amount of time has expired after the NSM 214 starts the retry timer. In various embodiments, the retry timer for the server 104 generates an event when various amounts of time have expired. For example, the retry timer for the server 104 can generate an event when five minutes have expired after the NSM 214 starts the retry timer. In another example, the retry timer for the server 104 can generate an event when seven minutes have expired after the NSM 214 starts the retry timer. Furthermore, in some embodiments, the amount of time that passes before the retry timer generates an event can differ for different servers, for different applications, and/or for different ones of the protocol stacks 212. Moreover, in some embodiments, the amount of time that passes before the retry timer generates an event can be user configurable.

Figure 7:
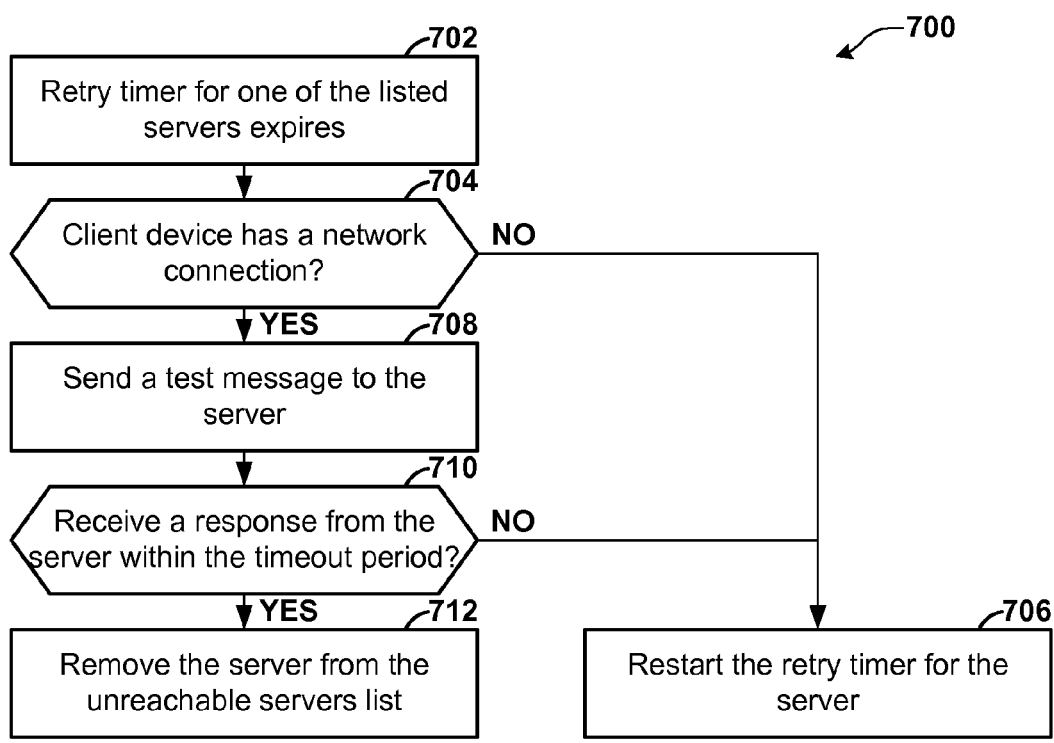
FIG. 7 is a flowchart illustrating an example operation performed by the network status module when a retry timer for one of the listed servers expires.

FIG. 7 is a flowchart illustrating an example operation 700 performed by the NSM 214 when a retry timer for one of the listed servers expires. As illustrated in the example of FIG. 7, the operation 700 begins when the NSM 214 receives an event indicating that a retry timer for one of the listed servers has expired (702). For ease of explanation, this specification assumes that the NSM 214 receives an event indicating that a retry timer for the server 104 has expired.

When the NSM 214 receives the event indicating that the retry timer for the server 104 has expired, the NSM 214 determines whether the client device 102 currently has any network connections (704). In other words, the NSM 214 determines whether the client device 102 is currently able to communicate with any other computing device through a communications network. In various embodiments, the NSM 214 determines whether the client device 102 currently has any network connections in various ways. For example, the NSM 214 can determine whether the client device 102 currently has any network connections by invoking one or more methods of an API provided by an operating system of the client device 102.

If the client device 102 currently has no network connections ("NO" of 704), the NSM 214 restarts the retry timer for the server 104 (706). The NSM 214 restarts the retry timer for the server 104 when the client device 102 currently has no network connections because when the client device 102 currently has no network connections, there is no possibility that the server 104 is reachable by the client device 102. Hence, there is no need to attempt to communicate with the server 104 to determine that the server 104 is still unreachable by the client device 102.

On the other hand, if the client device 102 has one or more network connections ("YES" of 604), the NSM 214 sends a test message to the server 104 (708). In various embodiments, the NSM 214 sends various types of test messages to the server 104. For example, in some embodiments, the NSM 214 sends a HTTP HEAD request to the server 104. The Internet Engineering Task Force (IETF) RFC 2616 defines the HTTP HEAD request. The HTTP HEAD request can be used for obtaining metadata about a resource indicated by the HTTP HEAD request without transferring the body of the resource to the client. In this example, the NSM 214 sends an HTTP HEAD request to the server 104 because many servers respond to HTTP HEAD requests and because most the HTTP status codes in HTTP responses to HTTP HEAD requests indicate whether servers are reachable. The use of HTTP HEAD requests can be more effective in determining whether servers are reachable than the use of Internet Control Message Protocol (ICMP) echo (i.e., ping) requests because ICMP echo requests are blocked by many servers and firewalls. In other examples, the NSM 214 sends other types of requests to the server 104, such as HTTP OPTIONS requests, FTP STAT requests, and so on.

Subsequently, the NSM 214 determines whether the client device 102 received a response from the server 104 within a timeout period (710). In various embodiments, the timeout period has various lengths. For example, the timeout period can be sixty seconds, ninety seconds, or another length of time. Furthermore, in some embodiments, the timeout period used by the NSM 214 is user configurable. Moreover, in some embodiments, the timeout periods used by NSMs used by different applications operating on the client device 102 can differ. If the client device 102 did not receive a response from the server 104 within the timeout period, the server 104 is still not reachable by the client device 102. Hence, if the client device 102 did not receive a response from the server 104 within the timeout period ("NO" of 710), the NSM 214 restarts the retry timer for the server 104 (706). The NSM 214 will typically receive a new event from the retry timer when a given amount of time has expired after the NSM 214 restarted the retry timer.

However, if the client device 102 received a response from the server 104 within the timeout period, the server 104 is reachable again by the client device 102. Hence, if the client device 102 received a response from the server 104 within the timeout period ("YES" of 710), the NSM 214 removes the server 104 from the unreachable servers list 218 (712).

Figure 8:
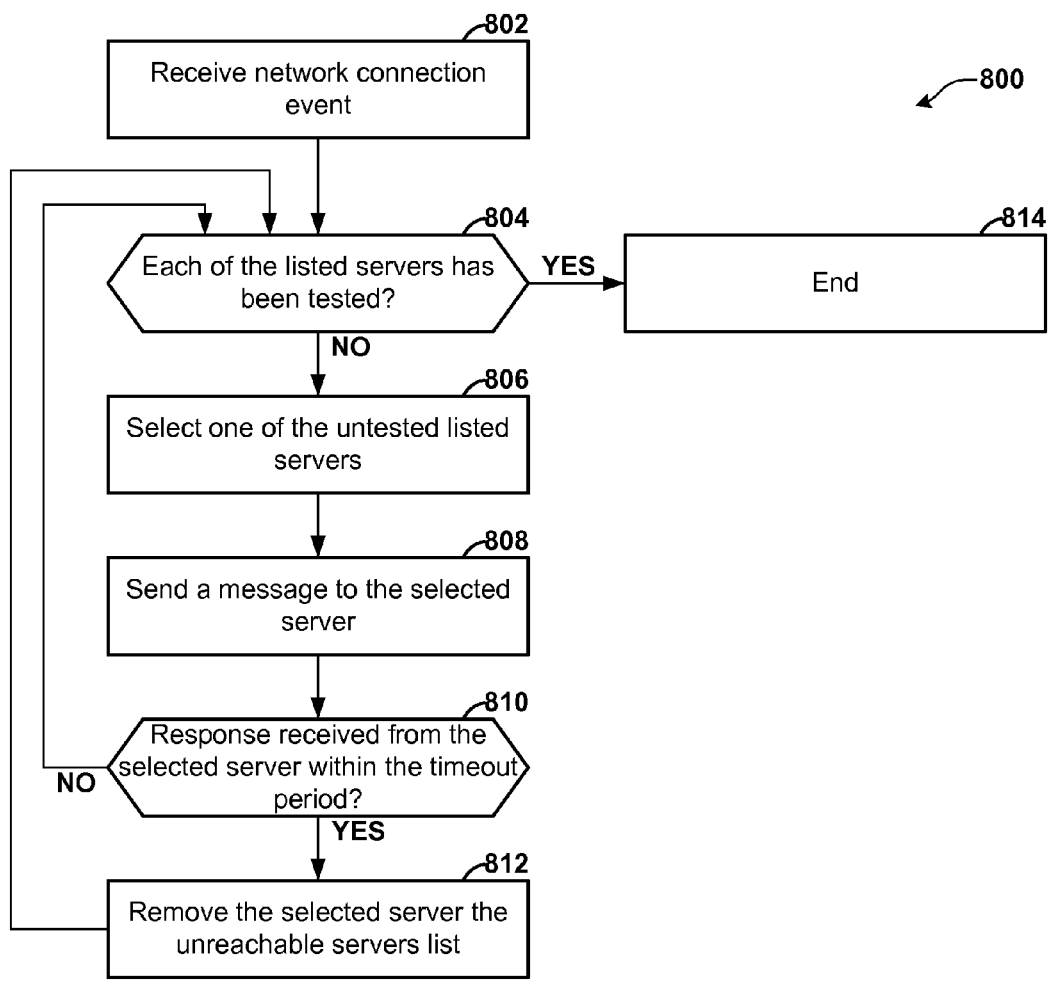
FIG. 8 is a flowchart illustrating an example operation performed by the network status module when a new network connection is added for the client device.

FIG. 8 is a flowchart illustrating an example operation 800 performed by the NSM 214 when a new network connection is added to the client device 102. As illustrated in the example of FIG. 8, the operation 800 begins when the NSM 214 receives a network connection event (802). The network connection event indicates that a new network connection has been added to the client device 102. In various embodiments, the NSM 214 receives a network connection event in various ways. For example, the NSM 214 can register a callback with an operating system of the client device 102 when the NSM 214 is initialized. In this example, the NSM 214 receives the network connection event through this callback. In another example, the NSM 214 receives the network connection event by periodically invoking one or more methods provided by the operating system of the client device 102 that return information regarding the network connections of the client device 102.

In response to the network connection event, the NSM 214 determines whether each of the listed servers has been tested (804). A listed server has been tested if the NSM 214 has, during the course of the operation 800, sent a test message to the listed server to determine whether the listed server is again reachable by the client device 102.

If there are one or more listed servers that have not been tested ("YES" of 804), the NSM 214 selects an untested one of the listed servers (806). In various embodiments, the NSM 214 selects an untested one of the listed servers in various ways. For example, in some embodiments, the NSM 214 selects one of the untested listed servers based on an order of the listed servers in the unreachable servers list 218. In another example, the NSM 214 selects one of the untested listed servers based on amounts of time that the untested listed servers have been listed in the unreachable servers list 218.

The NSM 214 then sends a message to the selected servers (808). In various embodiments, the NSM 214 sends various types of messages to the selected server. For example, in some embodiments, the NSM 214 sends a HTTP HEAD request to the selected server.

Subsequently, the NSM 214 determines whether the client device 102 received a response from the selected server within a timeout period (810). In this way, the NSM 214 tests whether the selected server is reachable by the client device 102. In various embodiments, the NSM 214 can use various timeout periods. For example, the NSM 214 can use timeout periods of thirty seconds, sixty seconds, ninety seconds, or some other length of time. If the client device 102 received a response from the selected server within the timeout period ("YES" of 810), the NSM 214 removes the selected server from the unreachable servers list 218 (812).

After either removing the selected server from the unreachable servers list 218 or after determining that the client device 102 did not receive a response from the selected server within the timeout period ("NO" of 810), the NSM 214 determines again whether there are one or more listed servers that have not been tested (804). If there are one or more listed servers that have not been tested, the NSM 214 repeats the steps 806, 808, 810, and possibly 812 with regard to another one of the untested listed servers. If the NSM 214 determines that each of the listed servers has been tested ("YES" of 804), the NSM 214 completes the operation 800 (814).

It should be appreciated that the operation 800 is merely one example. In other embodiments, the NSM 214 removes all of the servers from the unreachable servers list 218 when the NSM 214 receives a network connection event. In such embodiments, the NSM 214 does not send test messages to the listed servers when the NSM 214 receives the network connection event. Consequently, if one of the servers previously listed on the unreachable servers list 218 is still unreachable, the application 210 may wait for a timeout period to expire when attempting to communicate with this server.

Figure 9:
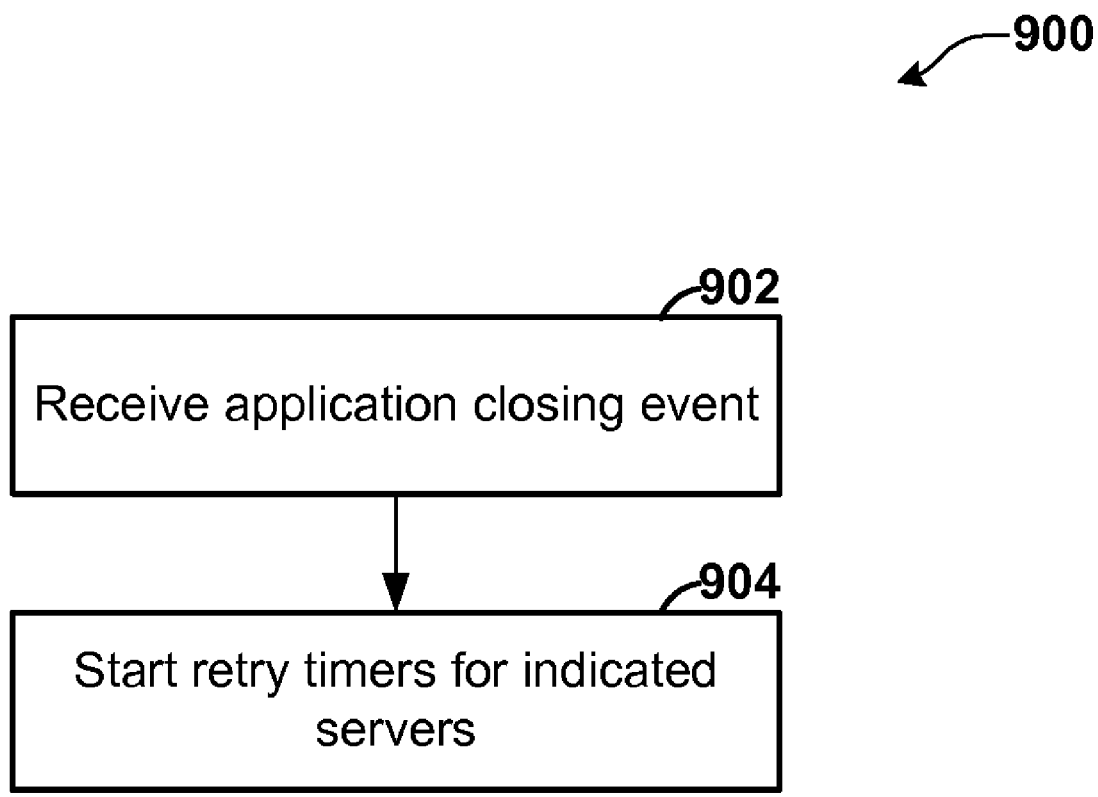
FIG. 9 is a flowchart illustrating an example operation of the sync module when the application closes.

FIG. 9 is a flowchart illustrating an example operation 900 of the sync module 216 when the application 210 closes. In some embodiments, the operation 900 illustrated in the example of FIG. 9 mitigates these issues. As illustrated in the example of FIG. 9, the operation 900 begins when the sync module 216 receives an application closing event (902). The application closing event indicates that an application is closing. For ease of explanation, this specification describes the example of FIG. 9 with the assumption that the application closing event indicates that the application 210 is closing.

In various embodiments, the sync module 216 receives the application closing event in various ways. For example, the sync module 216 establishes an event listener that listens for application closing events. In another example, the sync module 216 receives the application closing event when the application 210 sends a sends a message to the sync module 216 via inter-process communication. In yet another example, the sync module 216 receives the application closing event when the application 210 invokes a method of an API provided by the sync module 216.

The NSM 214 can monitor the reachability status for one or more listed servers. In other words, the NSM 214 can start retry timers for one or more listed servers and test the reachability status of these servers when their retry timers expire. For example, the NSM 214 can start a retry timer for a first server and a second server. In this example, the NSM 214 can perform the operation 700 illustrated in example of FIG. 7 when the retry timer for the first server expires and the retry timer for the second server expires.

In response to this application close event, the sync module 216 starts retry timers for servers monitored by the NSM 214 (904). For example, if the NSM 214 monitored the reachability status of a server "A" and a server "B," the sync module 216 can start a retry timer for the server "A" and a retry timer for the server "B."

In some embodiments, the retry timers started by the sync module 216 expire after different lengths of time than the retry timers started by the NSM 214. For example, the retry timers started by the sync module 216 can expire after ten minutes, whereas the retry timers started by the NSM 214 can expire after five minutes.

In some embodiments, the sync module 216 does not start retry timers for each of the servers monitored by the NSM 214. Rather, the sync module 216 can start retry timers for fewer than all of the servers monitored by the NSM 214. For example, in some embodiments, the sync module 216 starts a retry timer for a server monitored by the NSM 214 if the number of documents in the local cache 220 associated with the server is exceeds a given threshold or among the highest related to other listed servers having documents in the local cache 220.

Figure 10:
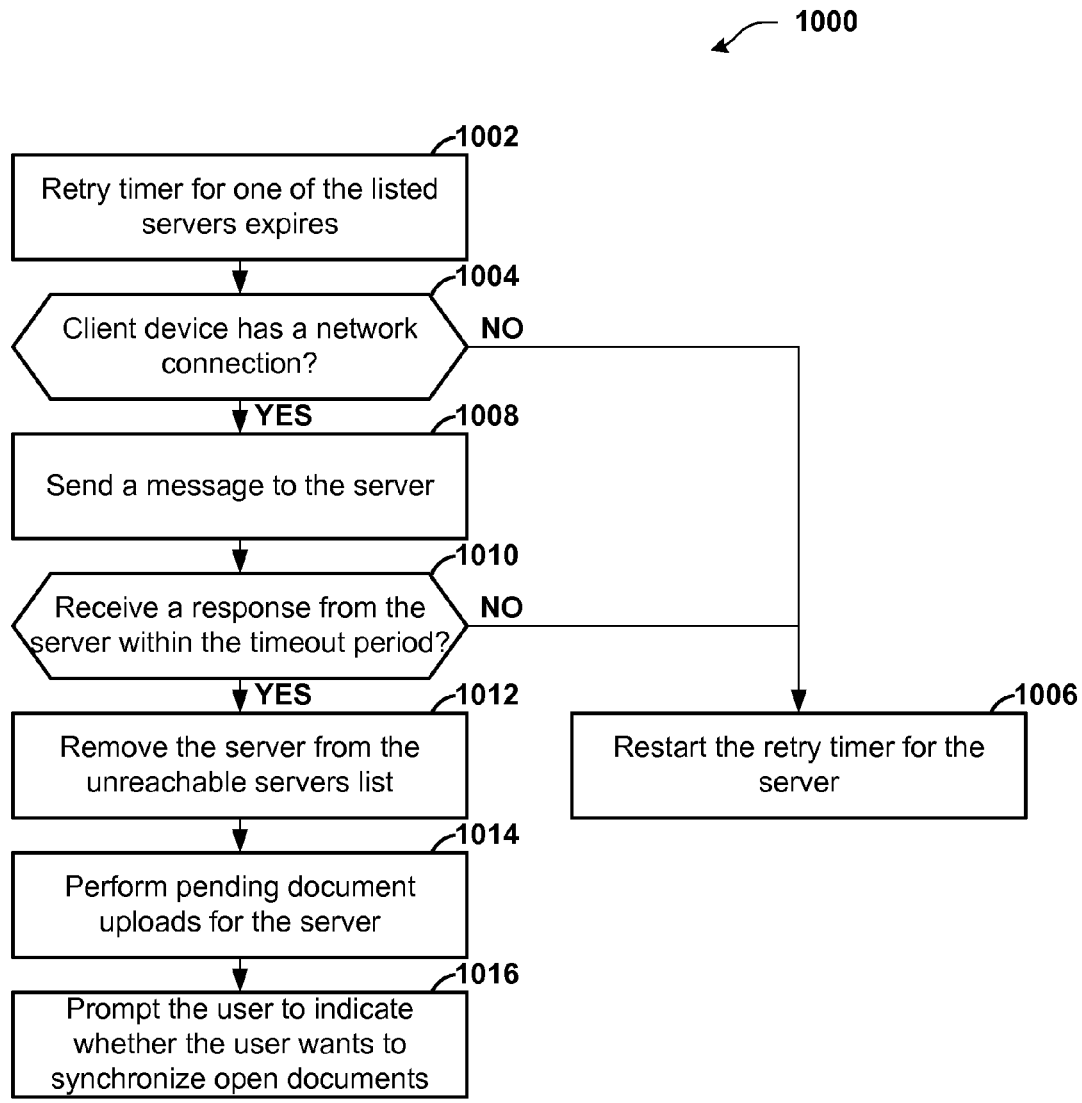
FIG. 10 is a flowchart illustrating an example operation of the sync module when a retry timer for a listed server expires.

FIG. 10 is a flowchart illustrating an example operation 1000 of the sync module 216 when a retry timer for a listed server expires. As illustrated in the example of FIG. 10, the operation 1000 begins when a retry timer for a listed server expires (1002). For ease of explanation, this specification assumes that the retry timer for the server 104 expires.

When the retry timer for the server 104 expires, the sync module 216 determines whether the client device 102 has any network connections (1004). If the client device 102 has no network connections ("NO" of 1004), the sync module 216 restarts the retry timer for the server 104 (1006).

On the other hand, if the client device 102 has one or more network connections ("YES" of 1004), the sync module 216 sends a message to the server 104 (1008). Subsequently, the sync module 216 determines whether the client device 102 has received a response from the server 104 within a timeout period (1010). If the client device 102 does not receive a response from the server 104 within the timeout period ("NO" of 1010), the sync module 216 restarts the retry timer for the server 104 (1008).

Otherwise, if the client device 102 received a response from the server 104 within the timeout period ("YES" of 1010), the sync module 216 removes the server 104 from the unreachable servers list 218 (1012). The sync module 216 then performs any pending document uploads associated with the server 104 (1014). For example, the user 108 may have modified a document associated with the server 104, saved the document in the local cache 220, and then closed the application 210. In this example, an upload of the document to the server 104 is pending. Thus, in this example, the sync module 216 uploads the document to the server 104 when the server 104 becomes reachable.

In addition, the sync module 216 prompts the user 108 to indicate whether the user 108 wants to synchronize open local documents with corresponding server documents stored by the server 104 (1016). For example, the user 108 may have modified a document associated with the server 104, saved the document in the local cache 220, closed the application 210, and then re-opened the local copy of the document in the application 210. In this example, the sync module 216 prompts the user 108 to determine whether the user 108 wants to synchronize the local copy of the document with the server copy of the document. If the user 108 wants to synchronize the local copy of the document with the server copy of the document, the sync module 216 can upload the local copy of the document to the server 104. In this example, the sync module 216 can also prompt the user 108 to determine whether to try to synchronize the local copy of the document with the server copy of the document when the user 108 opens the local copy of the document from the local cache 220. If the user 108 wants to try to synchronize the local copy of the document when the server copy of the document, the sync module 216 performs the operation 1000 with regard to the server (with the exception of step 1002).

Figure 11:
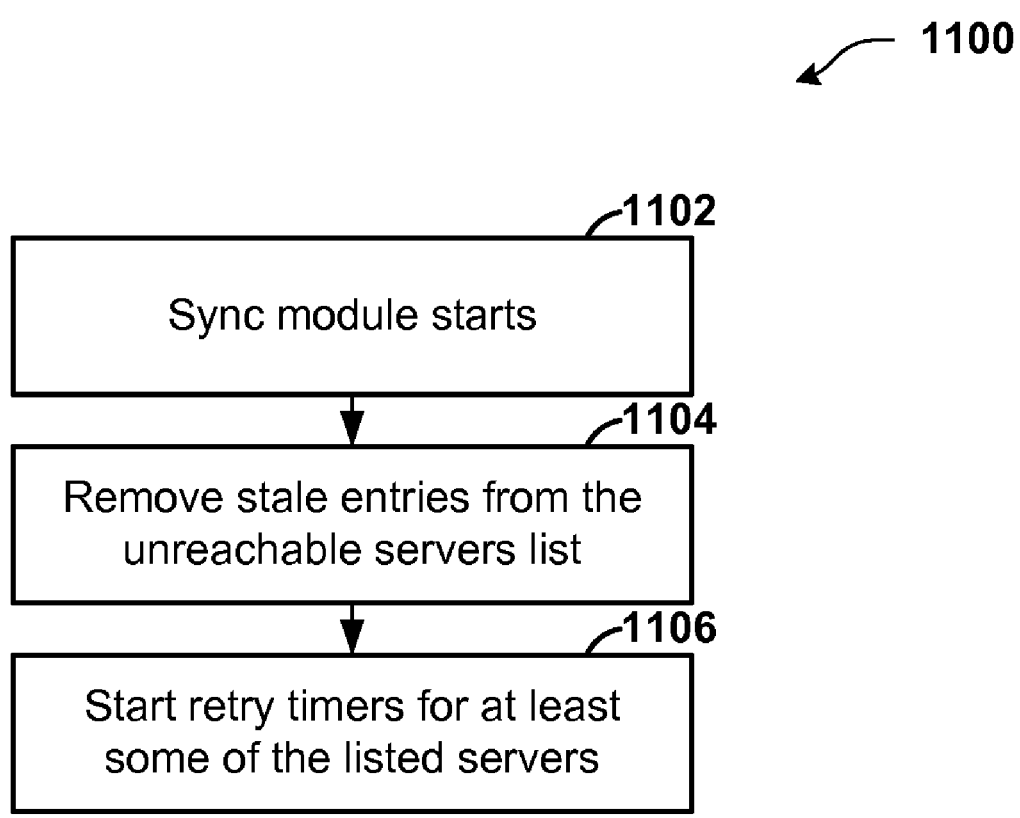
FIG. 11 is a flowchart illustrating an example operation of a sync module provided by the client device when the sync module starts.

FIG. 11 is a flowchart illustrating an example operation 1100 of the sync module 216 provided by the client device 102 when the sync module 216 starts. As illustrated in the example of FIG. 11, the operation 1100 starts when the sync module 216 starts (1102). In various embodiments, the sync module 216 can start in response to various events. For example, the sync module 216 can start when the client device 102 starts. In another example, the sync module 216 can start in response to input from the user 108.

When the sync module 216 starts, the sync module 216 removes stale entries from the unreachable servers list 218 (1104). The stale entries indicate servers that have been listed in the unreachable servers list 218 for more than a maximum time limit In various embodiments, the maximum time limit can be various amounts of time. For example, the maximum time limit can be 24 hours. In another example, the maximum time limit is 8 hours. Furthermore, in some embodiments, the maximum time limit is user configurable.

When the client device 102 shuts down, there may still be one or more servers listed on the unreachable servers list 218. While the client device 102 is shut down, neither the NSM 214 nor the sync module 216 is able remove entries from the unreachable servers list 218. Consequently, entries can remain on the unreachable servers list 218 for an indefinite amount of time while the client device 102 is shut down. When the client device 102 starts up, one or more of the listed servers may in fact be reachable by the client device 102. However, because these servers are listed in the unreachable servers list 218, the network stacks 212 do not attempt to send messages to these servers until the retry periods for these servers expires. Consequently, the user 108 may have to wait for a retry period to expire before the client device 102 can communicate with a server even though the server is reachable by the client device 102. By removing stale entries from the unreachable servers list 218 when the sync module 216 starts, the client device 102 can attempt to communicate with the servers without having to wait for the retry periods for the servers to expire.

After removing the stale entries from the unreachable servers list 218, the sync module 216 starts retry timers on one or more of the servers that remain listed on the unreachable servers list 218 (1106).

Figure 12:
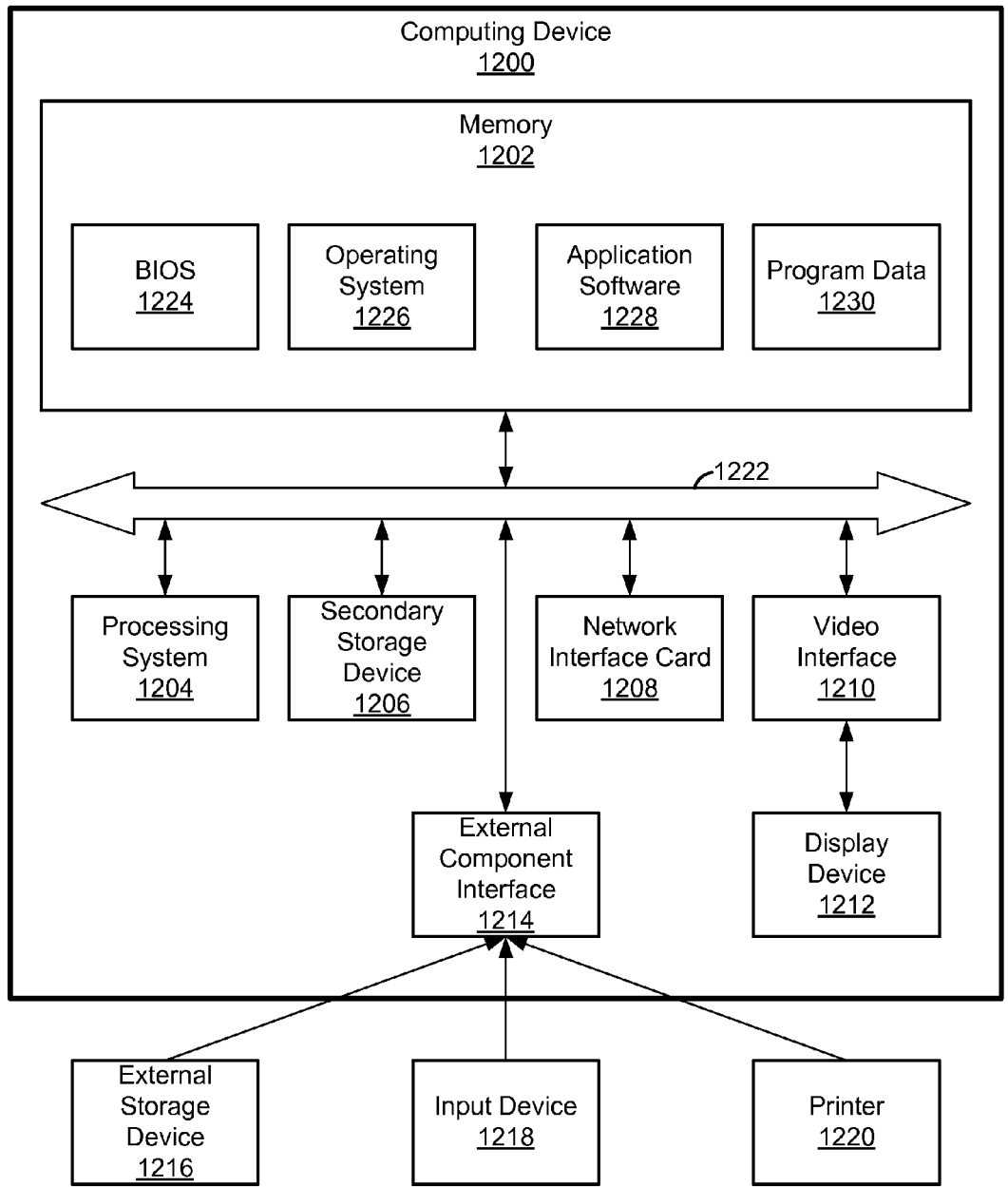
FIG. 12 is a block diagram illustrating an example computing device.

FIG. 12 is a block diagram illustrating an example computing device 1200. In some embodiments, the client device 102 and/or the server 104 are implemented using one or more computing devices like the computing device 1200. It should be appreciated that in other embodiments, the client device 102 and/or the server 104 are implemented using computing devices having hardware components other than those illustrated in the example of FIG. 12.

In different embodiments, computing devices are implemented in different ways. For instance, in the example of FIG. 12, the computing device 1200 comprises a memory 1202, a processing system 1204, a secondary storage device 1206, a network interface card 1208, a video interface 1210, a display device 1212, an external component interface 1214, an external storage device 1216, an input device 1218, a printer 1220, and a communication medium 1222. In other embodiments, computing devices are implemented using more or fewer hardware components. For instance, in another example embodiment, a computing device does not include a video interface, a display device, an external storage device, or an input device.

The term computer readable media as used herein may include computer storage media. Computer storage media may include volatile and nonvolatile, removable and non-removable media implemented in any method or technology for storage of information, such as computer readable instructions, data structures, program modules, or other data. The memory 1202 includes one or more computer storage media capable of storing data and/or instructions. As used in this document, a computer storage medium is a device or article of manufacture that stores data and/or software instructions readable by a computing device. In different embodiments, the memory 1202 is implemented in different ways. For instance, in various embodiments, the memory 1202 is implemented using various types of computer storage media. Example types of computer storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The processing system 1204 includes one or more physical integrated circuits that selectively execute software instructions. In various embodiments, the processing system 1204 is implemented in various ways. For instance, in one example embodiment, the processing system 1204 is implemented as one or more processing cores. For instance, in this example embodiment, the processing system 1204 may be implemented as one or more Intel Core 2 microprocessors. In another example embodiment, the processing system 1204 is implemented as one or more separate microprocessors. In yet another example embodiment, the processing system 1204 is implemented as an ASIC that provides specific functionality. In yet another example embodiment, the processing system 1204 provides specific functionality by using an ASIC and by executing software instructions.

In different embodiments, the processing system 1204 executes software instructions in different instruction sets. For instance, in various embodiments, the processing system 1204 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 1206 includes one or more computer-readable data storage media. The secondary storage device 1206 stores data and software instructions not directly accessible by the processing system 1204. In other words, the processing system 1204 performs an I/O operation to retrieve data and/or software instructions from the secondary storage device 1206. In various embodiments, the secondary storage device 1206 is implemented by various types of computer-readable data storage media. For instance, the secondary storage device 1206 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 1208 enables the computing device 1200 to send data to and receive data from a computer communication network. In different embodiments, the network interface card 1208 is implemented in different ways. For example, in various embodiments, the network interface card 1208 is implemented as an Ethernet interface, a token-ring network interface, a fiber optic network interface, a wireless network interface (e.g., WiFi, WiMax, etc.), or another type of network interface.

The video interface 1210 enables the computing device 1200 to output video information to the display device 1212. In different embodiments, the video interface 1210 is implemented in different ways. For instance, in one example embodiment, the video interface 1210 is integrated into a motherboard of the computing device 1200. In another example embodiment, the video interface 1210 is a video expansion card. Example types of video expansion cards include Radeon graphics cards manufactured by Advanced Micro Devices, Inc. of Sunnyvale, Calif., Geforce graphics cards manufactured by Nvidia Corporation of Santa Clara, Calif., and other types of graphics cards.

In various embodiments, the display device 1212 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 1210 communicates with the display device 1212 in various ways. For instance, in various embodiments, the video interface 1210 communicates with the display device 1212 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 1214 enables the computing device 1200 to communicate with external devices. In various embodiments, the external component interface 1214 is implemented in different ways. For instance, in one example embodiment, the external component interface 1214 is a USB interface. In other example embodiments, the computing device 1200 is a FireWire interface, a serial port interface, a parallel port interface, a PS/2 interface, and/or another type of interface that enables the computing device 1200 to communicate with external components.

In different embodiments, the external component interface 1214 enables the computing device 1200 to communicate with different external components. For instance, in the example of FIG. 12, the external component interface 1214 enables the computing device 1200 to communicate with the external storage device 1216, the input device 1218, and the printer 1220. In other embodiments, the external component interface 1214 enables the computing device 1200 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 1200.

The external storage device 1216 is an external component comprising one or more computer readable data storage media. Different implementations of the computing device 1200 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 1218 is an external component that provides user input to the computing device 1200. Different implementations of the computing device 1200 interface with different types of input devices. Example types of input devices include, but are not limited to, keyboards, mice, trackballs, stylus input devices, key pads, microphones, joysticks, touch-sensitive display screens, and other types of devices that provide user input to the computing device 1200. The printer 1220 is an external device that prints data to paper. Different implementations of the computing device 1200 interface with different types of printers. Example types of printers include, but are not limited to laser printers, ink jet printers, photo printers, copy machines, fax machines, receipt printers, dot matrix printers, or other types of devices that print data to paper.

The communications medium 1222 facilitates communication among the hardware components of the computing device 1200. In different embodiments, the communications medium 1222 facilitates communication among different components of the computing device 1200. For instance, in the example of FIG. 12, the communications medium 1222 facilitates communication among the memory 1202, the processing system 1204, the secondary storage device 1206, the network interface card 1208, the video interface 1210, and the external component interface 1214. In different implementations of the computing device 1200, the communications medium 1222 is implemented in different ways. For instance, in different implementations of the computing device 1200, the communications medium 1222 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1202 stores various types of data and/or software instructions. For instance, in the example of FIG. 12, the memory 1202 stores a Basic Input/Output System (BIOS) 1224, an operating system 1226, application software 1228, and program data 1230. The BIOS 1224 includes a set of software instructions that, when executed by the processing system 1204, cause the computing device 1200 to boot up. The operating system 1226 includes a set of software instructions that, when executed by the processing system 1204, cause the computing device 1200 to provide an operating system that coordinates the activities and sharing of resources of the computing device 1200. Example types of operating systems include, but are not limited to, Microsoft Windows®, Linux, Unix, Apple OS X, Apple OS X iPhone, Palm webOS, Palm OS, Google Chrome OS, Google Android OS, and so on. The application software 1228 includes a set of software instructions that, when executed by the processing system 1204, cause the computing device 1200 to provide applications to a user of the computing device 1200. The program data 1230 is data generated and/or used by the application software 1228.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders.

We claim:
1. A method comprising:
providing a client device that provides an application;
providing, by the computing device, an application that uses multiple protocol stacks to communicate with a server, wherein if an attempt by the application to communicate with the server using a first one of the protocol stacks times out, the application performs a timeout activity without waiting for a timeout period to expire when the application reaches a point where the application would attempt to communicate with the server using a second one of the protocol stacks;

determining whether the attempt by the application to communicate with the server using the first protocol stack timed out; and adding the server to an unreachable servers list when the attempt by the application to communicate with the server using the first protocol stack timed out; and automatically removing the server from the unreachable servers list when the server has been listed on the unreachable servers list for more than a maximum time limit;

wherein providing the application comprises:

providing a stack request to the second protocol stack when the application reaches the point where the application would attempt to communicate with the server using the second protocol stack;

receiving, if the server is listed on the unreachable servers list, a timeout stack response from the second protocol stack in response to the stack request before the timeout period expires, wherein the timeout stack response is a stack response comprising a timeout error;

receiving, if the server is not listed on the unreachable servers list and the client device failed to receive a response message within the timeout period, the timeout stack response from the second protocol stack in response to the stack request, wherein the response message is a message sent by the server in response to a message sent to the server by the second protocol stack in response to the stack request;

performing the timeout activity in response to receiving the timeout stack response; and performing a different activity in response to receive a stack response that does not comprise a timeout error.

2. The method of claim 1, wherein providing the application comprises:

providing a stack request to the second protocol stack, the stack request comprising a request to communicate to the server using the second protocol stack;

receiving a stack response from the second protocol stack in response to the stack request, the stack response comprises a timeout error when the attempt to communicate with the server using the first protocol stack timed out or when the client device failed to receive a response to a message sent to the server by the second protocol stack in response to the stack request; and wherein the application performs the timeout activity when the stack response comprises a timeout error.

3. The method of claim 2, wherein the application is not responsive to user input between a time when the application provides the stack request to the second protocol stack and a time when the application receives the stack response from the second protocol stack.

4. The method of claim 1, wherein each server listed in the unreachable servers list is uniquely identified in the unreachable servers list.

5. The method of claim 1, further comprising:

periodically sending test messages to a given server on the unreachable servers list to test whether the given server is reachable by the client device; and removing the given server from the unreachable servers list when the client device receives a response from the given server to one of the test messages.

6. The method of claim 5, wherein the client device periodically sends the test messages to the given server after the application closes.

7. The method of claim 1, further comprising:

determining that a network connection has been added to the client device;

in response to determining that the network connection has been added to the client device, sending test messages to servers listed on the unreachable servers list; and removing one or more of the servers from the unreachable servers list when the client device receives responses from the servers to the test messages.

8. The method of claim 5, further comprising: removing a server from the unreachable servers list in response to input from a user of the application.

9. The method of claim 1, wherein the first protocol stack and the second protocol stack provide software infrastructure for different sets of communications protocols; and wherein the first protocol stack and the second protocol stack maintain separate sessions with the server.

10. The method of claim 1, wherein the application attempts to communicate with the server using the first protocol stack and attempts to communicate with the server using the second protocol stack as part of an operation to open a server document, the server document being a document stored by the server;

wherein the timeout activity comprises: opening a local document that corresponds to the server document, the local document being a document stored at the client device; and wherein the application retrieves a copy of the server document from the server when neither the attempt to communicate with the server using the first protocol stack nor the attempt to communicate with the server using the second protocol stack times out.

11. The method of claim 1, further comprising: providing, by the computing device, another application that uses multiple protocol stacks to communicate with the server, wherein if an attempt by the application to communicate with the server times out, the other application performs a timeout activity without waiting for a timeout period to expire when the other application reaches a point where the application would attempt to communicate with the server.

12. A computing device comprising:

a processing system; and a data storage system that stores computer-readable instructions that, when executed by the processing system, cause the computing device to:

provide a first protocol stack and a second protocol stack;

provide an application that attempts to use the first protocol stack to send a first message to a server and attempts to use the second protocol stack to send a second message to the server, wherein the application attempts to communicate with the server using the first protocol stack and attempts to communicate with the server using the second protocol stack as part of an operation to open a server document, the server document being a document stored by the server, wherein if the attempt by the application to communicate with the server using the first protocol stack times out, the application performs a timeout activity without waiting for a timeout period to expire when the application reaches a point where the application would attempt to communicate with the server using the first protocol stack again, the timeout activity comprising opening a local document that corresponds to the server document, the local document being a document stored at the computing device, after attempting to send the second message to the server, the application:
  if the first message timed out, performs the timeout activity before a timeout period for the second message expires;
  if the first message did not time out, performs the timeout activity when the timeout period for the second message expires; and
  if the computing device received a response to the second message from the server before the timeout period for the second message expires, performs a different activity.

13. The computing device of claim 12,
wherein the application receives a stack response from the second protocol stack in response to the attempt to send the second message to the server, the stack response comprising a timeout error when the computing device failed to receive a response from the server to either the first message or the second message; and
wherein the application performs the timeout activity when the stack response comprises a timeout error.

14. The computing device of claim 13,
wherein the application is not responsive to user input between a time when the application attempts to send the first message to the server and a time when the application receives a stack response from the first protocol stack; and
wherein the application is not responsive to user input between a time when the application attempts to send the second message to the server and a time when the application receives the stack response from the second protocol stack.

15. The computing device of claim 12,
wherein the data storage system comprises an unreachable servers list; and
wherein when the first message times out, the server is added to the unreachable servers list;
wherein after attempting to send the second message to the server, the application performs the timeout activity when the server is listed in the unreachable servers list.

16. The computing device of claim 15, wherein the data storage system stores instructions that, when executed by the processing system, cause the computing device to:
  periodically send test messages to a given server on the unreachable servers list to test whether the given server is reachable by the computing device; and
  remove the given server from the unreachable servers list when the computing device receives a response from the given server to one of the test messages.

17. A computer storage medium, wherein the computer storage medium does not include a transmission signal, the computer storage medium comprising instructions that, when executed by a computing device, cause the computing device to:
  provide, by an application, a first stack request to a first protocol stack;
  in response to the first stack request, send a first message to a server;
  determine whether the computing device received a response to the first message from the server within a timeout period;
  add the server to an unreachable servers list when the computing device did not receive a response to the first message from the server within the timeout period;
  automatically remove the server from the unreachable servers list when the server has been listed on the unreachable servers list for more than a maximum time limit;
  provide, by the application, a second stack request to a second protocol stack;
  in response to the second stack request, determine whether the server is listed on the unreachable servers list;
  provide, from the second protocol stack to the application, a stack response comprising a timeout error without waiting for another timeout period to expire when the server is listed on the unreachable servers list;
  send, by the second protocol stack, a second message to the server when the server is not listed on the unreachable servers list;
  provide, from the second protocol stack to the application, a stack response comprising a timeout error when the computing device does not receive a response to the second message from the server;
  provide, from the second protocol stack to the application, a stack response not comprising a timeout error when the computing device receives a server response to the second message;
  perform, by the application, a timeout activity in response to receiving a stack response from the second protocol stack comprising a timeout error;
  perform, by the application, a non-timeout activity in response to receiving a stack response from the second protocol stack not comprising a timeout error.

* * * * *